(12) United States Patent
Yoon et al.

(10) Patent No.: US 12,075,396 B2
(45) Date of Patent: Aug. 27, 2024

(54) METHOD FOR TRANSMITTING AND RECEIVING SIGNAL IN WIRELESS COMMUNICATION SYSTEM, AND DEVICE SUPPORTING SAME

(71) Applicant: LG ELECTRONICS INC., Seoul (KR)

(72) Inventors: Sukhyon Yoon, Seoul (KR); Kijun Kim, Seoul (KR); Suckchel Yang, Seoul (KR); Seonwook Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 344 days.

(21) Appl. No.: 17/642,119

(22) PCT Filed: Sep. 18, 2020

(86) PCT No.: PCT/KR2020/012625
§ 371 (c)(1),
(2) Date: Mar. 10, 2022

(87) PCT Pub. No.: WO2021/054765
PCT Pub. Date: Mar. 25, 2021

(65) Prior Publication Data
US 2022/0377737 A1 Nov. 24, 2022

(30) Foreign Application Priority Data
Sep. 19, 2019 (KR) .......................... 10-2019-0115088

(51) Int. Cl.
*H04W 72/0453* (2023.01)

(52) U.S. Cl.
CPC .............................. *H04W 72/0453* (2013.01)

(58) Field of Classification Search
None
See application file for complete search history.

(56) References Cited

U.S. PATENT DOCUMENTS

| 10,644,916 B1 * | 5/2020 | Shattil ................. H04L 27/2614 |
| 2011/0064041 A1 | 3/2011 | Hooli et al. |

(Continued)

FOREIGN PATENT DOCUMENTS

| KR | 10-2018-0100047 A | 9/2018 |
| WO | 2014139562 A1 | 9/2014 |

(Continued)

OTHER PUBLICATIONS

R1-1901312: 3GPP TSG RAN WG1 Meeting AH 1901, IITH, CeWiT, Reliance Jio, IITM, Tejas Networks, "Low PaPR Reference Signals," Jan. 21, 2019 (11 Pages).

(Continued)

*Primary Examiner* — Anh Vu H Ly
(74) *Attorney, Agent, or Firm* — BRYAN CAVE LEIGHTON PAISNER LLP

(57) ABSTRACT

Various embodiments relate to a next generation wireless communication system for supporting a higher data transmission rate, etcetera, than a $4^{th}$ generation wireless (4G) communication system. Provided in various embodiments are a method for transmitting and receiving a signal in a wireless communication system and an apparatus supporting same, and various other embodiments may be provided.

13 Claims, 22 Drawing Sheets

(56) References Cited

U.S. PATENT DOCUMENTS

| | | | |
|---|---|---|---|
| 2017/0207941 A1* | 7/2017 | Park | H04L 27/26526 |
| 2018/0083814 A1* | 3/2018 | Dore | H04L 27/2633 |
| 2018/0324005 A1* | 11/2018 | Kim | H04L 27/2035 |
| 2019/0199569 A1 | 6/2019 | Bala et al. | |
| 2023/0171057 A1* | 6/2023 | Cha | H04L 27/2613 |
| | | | 370/329 |

FOREIGN PATENT DOCUMENTS

| | | | | |
|---|---|---|---|---|
| WO | 2017173131 A1 | 10/2017 | | |
| WO | WO-2017173125 A1 * | 10/2017 | | H04L 25/0224 |

OTHER PUBLICATIONS

Interdigital Inc: "Discussion on Potential Waveform Solutions for NR Unlicensed", 3GPP TSG RAN WG1 Meeting #93, R1-1807040, Busan, Korea, May 21-25, 2018; Retrieved from the Internet: URL:http://www.3gpp.orgiftpitsg%5Fran/WG1°/O5FRL1/TSGR1°/O5F93/Docs [retrieved on May 12, 2018].

Qualcomm Incorporated: "Waveform options for 60GHz band" 3GPP TSG RAN WG1 Meeting #92bix, R1-1804833, Sanya, China, Apr. 16-20, 2018; Retrieved from the Internet: URL:http://www.3gpp.org/ftp/tsg%5 Fran/WG1°/o5F RL1/ TSGR1°/O5F92b/Docs/ [retrieved on Apr. 7, 2018].

XP011634873: Sahin et al. Flexible DFT-S-OFDM: Solutions and Challenges, New Waveforms and Multiple Access Methods for 5G Networks, IEEE Communications Magazine, Nov. 2016, (pp. 106-112).

* cited by examiner

FIG. 11
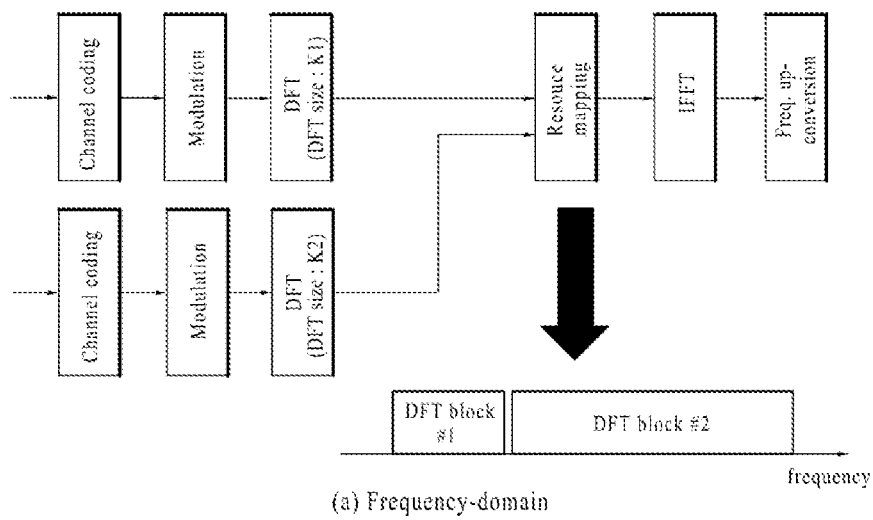
(a) Frequency-domain
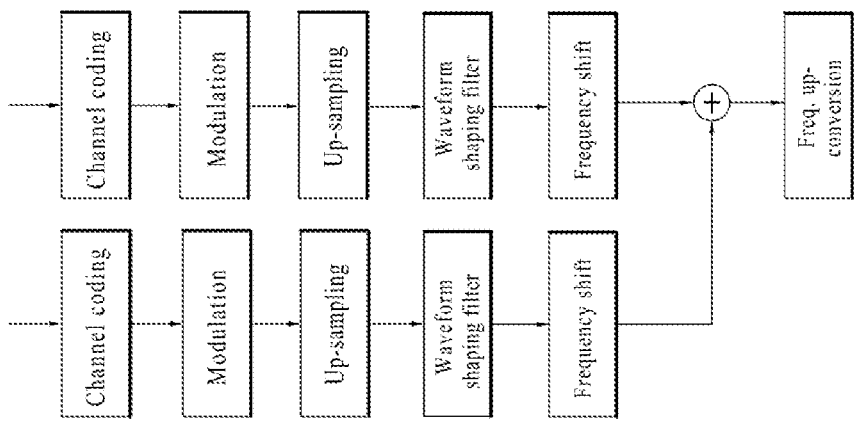
(b) time-domain

METHOD FOR TRANSMITTING AND RECEIVING SIGNAL IN WIRELESS COMMUNICATION SYSTEM, AND DEVICE SUPPORTING SAME

This application is the National Stage filing under 35 U.S.C. 371 of International Application No. PCT/KR2020/012625 filed on Sep. 18, 2020, which claims priority to Korean Patent Application No. 10-2019-0115088 filed on Sep. 19, 2019, the contents of which are all hereby incorporated by reference herein in their entirety.

TECHNICAL FIELD

Various embodiments relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Task

Various embodiments can provide a method for transmitting and receiving a signal in a wireless communication system and an apparatus supporting the same.

Various embodiments can provide a method for reducing complexity of implementation of a transmission/reception device in a wireless communication system and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solutions

Various embodiments may provide a method for transmitting and receiving a signal in a wireless communication system and an apparatus supporting the same.

According to various embodiments, a method performed by a first apparatus in a wireless communication system may be provided.

According to various embodiment, the method may include obtaining a data channel based on discrete Fourier transform-spread-orthogonal frequency division multiplexing (DFT-s-OFDM), and transmitting the data channel.

According to various embodiment, the data channel may be mapped to one or more first subcarriers in a frequency domain.

According to various embodiment, a size of a first discrete Fourier transform (DFT) block related to the one or more first subcarriers may be 1/N times a size of an inverse fast Fourier transform (IFFT) block related to a preset sampling frequency, and N may be a natural number.

According to various embodiment, the size of the first DFT block may be limited such that 1/N times the size of the DFT block is satisfied below a maximum DFT block size.

According to various embodiment, a control channel for scheduling the data channel may include information for setting the size of the first DFT block.

According to various embodiment, the maximum DFT block size may be predefined or configured in a call setup process.

According to various embodiment, based on IFFT for obtaining the data channel being configured to be performed, the data channel may be obtained based on applying the IFFT related to the IFFT block to an output of the first DFT block.

According to various embodiment, based on upsampling for obtaining the data channel being configured to be performed, the data channel may be obtained based on applying upsampling to a modulated symbol.

According to various embodiment, a filter set for downsampling corresponding to upsampling may be predefined or configured in a call setup process.

According to various embodiment, the data channel may be obtained based on spectrum shaping.

According to various embodiment, based on the IFFT for obtaining the data channel being configured to be performed, spectrum shaping may be performed based on applying a spectrum shaping filter to the output of the first DFT block.

According to various embodiment, based on upsampling for obtaining the data channel being configured to be performed, spectrum shaping may be performed based on applying a waveform shaping filter after the upsampling is applied.

According to various embodiment, the waveform shaping filter may be set such that an output of the waveform shaping filter corresponds to an output of the spectrum shaping filter.

According to various embodiment, the data channel may be mapped to the one of more first subcarriers and one or more second subcarriers in the frequency domain.

According to various embodiment, a size of a second DFT block related to the one or more second subcarriers may be 1/M times the size of the IFFT block, and M may be a natural number.

According to various embodiment, the method may further include transmitting information for configuring a second apparatus to receive the data channel on (i) the one or more first subcarriers or the one or more second subcarriers or (ii) both the one or more first subcarriers and the one or more second subcarriers based on one or more of a traffic load and capability of the second apparatus receiving the data channel.

According to various embodiment, (i) the number of subcarriers included in each of one or more resource blocks (RBs) including the one or more first subcarriers may satisfy $2^A$, (ii) among numbers greater than the number of one or more first subcarriers, a smallest number among numbers satisfying 1/N times the size of the IFFT block may be the size of the first DFT block, or (iii) among numbers less than the number of one or more first subcarriers, a largest number among numbers satisfying 1/N times the size of the IFFT block may be the size of the first DFT block, and A may be an integer greater than or equal to 0.

According to various embodiment, the method may further include transmitting a control channel for scheduling the data channel.

According to various embodiment, the control channel may be mapped to one or more third subcarriers in the frequency domain.

According to various embodiment, a size of a third DFT block related to the one or more third subcarriers may be 1/B times the size of the IFFT block, and B may be a natural number.

According to various embodiment, based on the data channel and the control channel being transmitted in different frequency bands in a single carrier, the control channel may include information on a frequency band in which the data channel is transmitted.

According to various embodiment, a timing gap corresponding to the capability of the second apparatus receiving the data channel and a second channel may be set between the data channel and the control channel.

According to various embodiment, a first apparatus operating in a wireless communication system may be provided.

According to various embodiment, the first apparatus may include a memory and at least one processor coupled with the memory.

According to various embodiment, the one or more processors may obtain a data channel based on discrete Fourier transform-spread-orthogonal frequency division multiplexing (DFT-s-OFDM), and transmit the data channel.

According to various embodiment, the data channel may be mapped to one or more first subcarriers in a frequency domain.

According to various embodiment, a size of a first discrete Fourier transform (DFT) block related to the one or more first subcarriers may be 1/N times a size of an inverse fast Fourier transform (IFFT) block related to a preset sampling frequency, and N may be a natural number.

According to various embodiment, the size of the first DFT block may be limited such that 1/N times the size of the IFFT block is satisfied below a maximum DFT block size.

According to various embodiment, a control channel for scheduling the data channel may include information for setting the size of the first DFT block.

According to various embodiment, the maximum DFT block size may be predefined or configured in a call setup process.

According to various embodiment, the apparatus may communicate with one or more of a mobile terminal, a network, and an autonomous vehicle other than a vehicle including the apparatus.

According to various embodiment, a method performed by a second apparatus in a wireless communication system may be provided.

According to various embodiment, the method may include receiving a data channel based on discrete Fourier transform-spread-orthogonal frequency division multiplexing (DFT-s-OFDM), and obtaining data based on the data channel.

According to various embodiment, the data channel may be mapped to one or more first subcarriers in a frequency domain.

According to various embodiment, a size of a first inverse discrete Fourier transform (DFT) block related to the one or more first subcarriers may be 1/N times a size of an fast Fourier transform (IFFT) block related to a preset sampling frequency, and N may be a natural number.

According to various embodiment, a second apparatus operating in a wireless communication system may be provided.

According to various embodiment, the second apparatus may include a memory and at least one processor coupled with the memory.

According to various embodiment, the one or more processors may receive a data channel based on discrete Fourier transform-spread-orthogonal frequency division multiplexing (DFT-s-OFDM), and obtain data based on the data channel.

According to various embodiment, the data channel may be mapped to one or more first subcarriers in a frequency domain.

According to various embodiment, a size of a first inverse discrete Fourier transform (IDFT) block related to the one or more first subcarriers may be 1/N times a size of a fast Fourier transform (FFT) block related to a preset sampling frequency, and N may be a natural number.

According to various embodiment, an apparatus operating in a wireless communication system may be provided.

According to various embodiment, the apparatus may include one or more processors and one or more memories storing one or more instructions for causing the one or more processors to perform a method.

According to various embodiment, the method may include obtaining a data channel based on discrete Fourier transform-spread-orthogonal frequency division multiplexing (DFT-s-OFDM), and transmitting the data channel.

According to various embodiment, the data channel may be mapped to one or more first subcarriers in a frequency domain.

According to various embodiment, a size of a first inverse discrete Fourier transform (IDFT) block related to the one or more first subcarriers may be 1/N times a size of a fast Fourier transform (FFT) block related to a preset sampling frequency, and N may be a natural number.

According to various embodiment, a processor-readable medium storing one or more instructions for causing one or more processors to perform a method may be provided.

According to various embodiment, the method may include obtaining a data channel based on discrete Fourier transform-spread-orthogonal frequency division multiplexing (DFT-s-OFDM), and transmitting the data channel.

According to various embodiment, the data channel may be mapped to one or more first subcarriers in a frequency domain.

According to various embodiment, a size of a first discrete Fourier transform (DFT) block related to the one or more first subcarriers may be 1/N times a size of an inverse fast Fourier transform (IFFT) block related to a preset sampling frequency, and N may be a natural number.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments, a method for transmitting and receiving a signal in a wireless communication system and an apparatus supporting the same can be provided.

According to various embodiments, there is no need to perform additional operations such as FFT/IDFT from the viewpoint of reception, and thus complexity of implementation of a receiver can be reduced.

According to various embodiments, there is no need to perform additional operations such as DFT/IFFT from the viewpoint of transmission, and thus complexity of implementation of a transmitter can be reduced.

According to various embodiments, a PAPR can be reduced in a mmWave wireless communication system.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to aid in understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 11 is a diagram illustrating an example of a transmission method using multiple DFT blocks according to various embodiments.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, documents such as 3GPP TS 37.213, 3GPP TS 38.211, 3GPP TS 38.212, 3GPP TS 38.213, 3GPP TS 38.214, 3GPP TS 38.215, 3GPP TS 38.300, 3GPP TS 38.321 and 3GPP TS 38.331 may be referenced.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
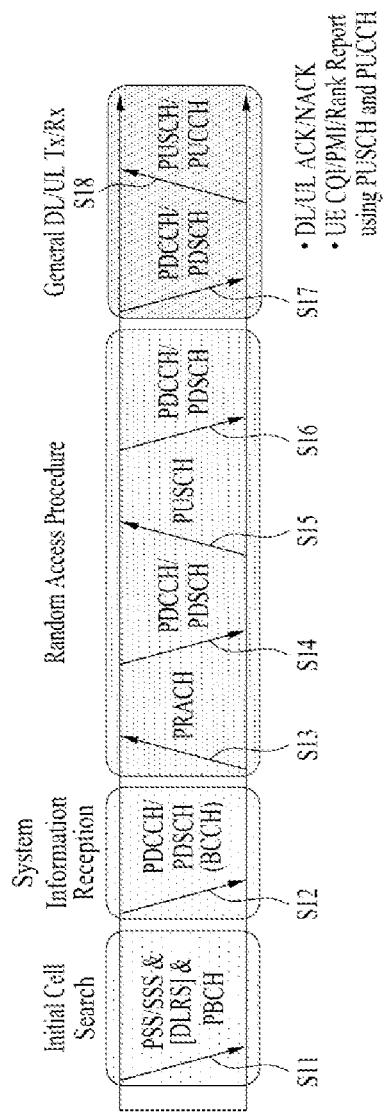
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH related to the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
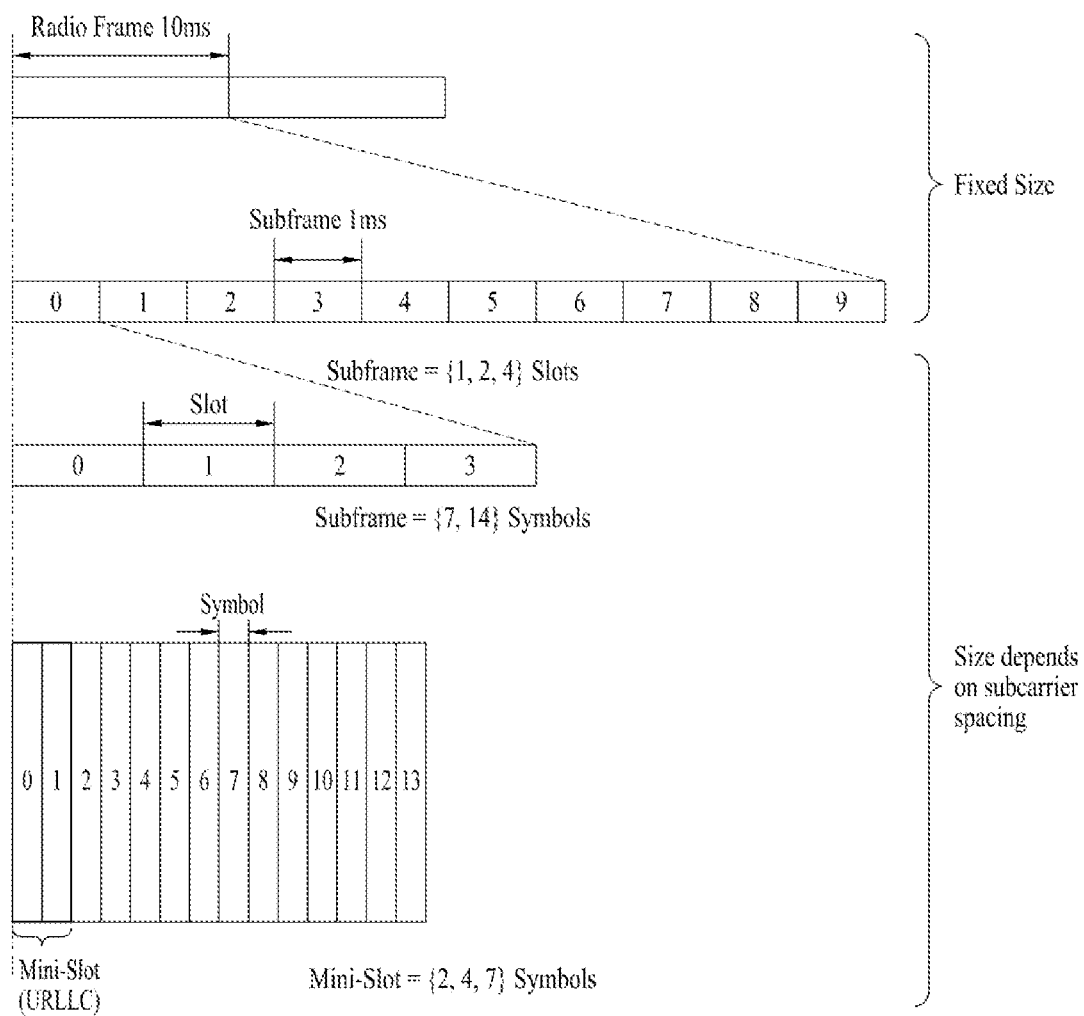
FIG. 2 is a diagram illustrating a resource grid in a new radio (NR) system to which various embodiments are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
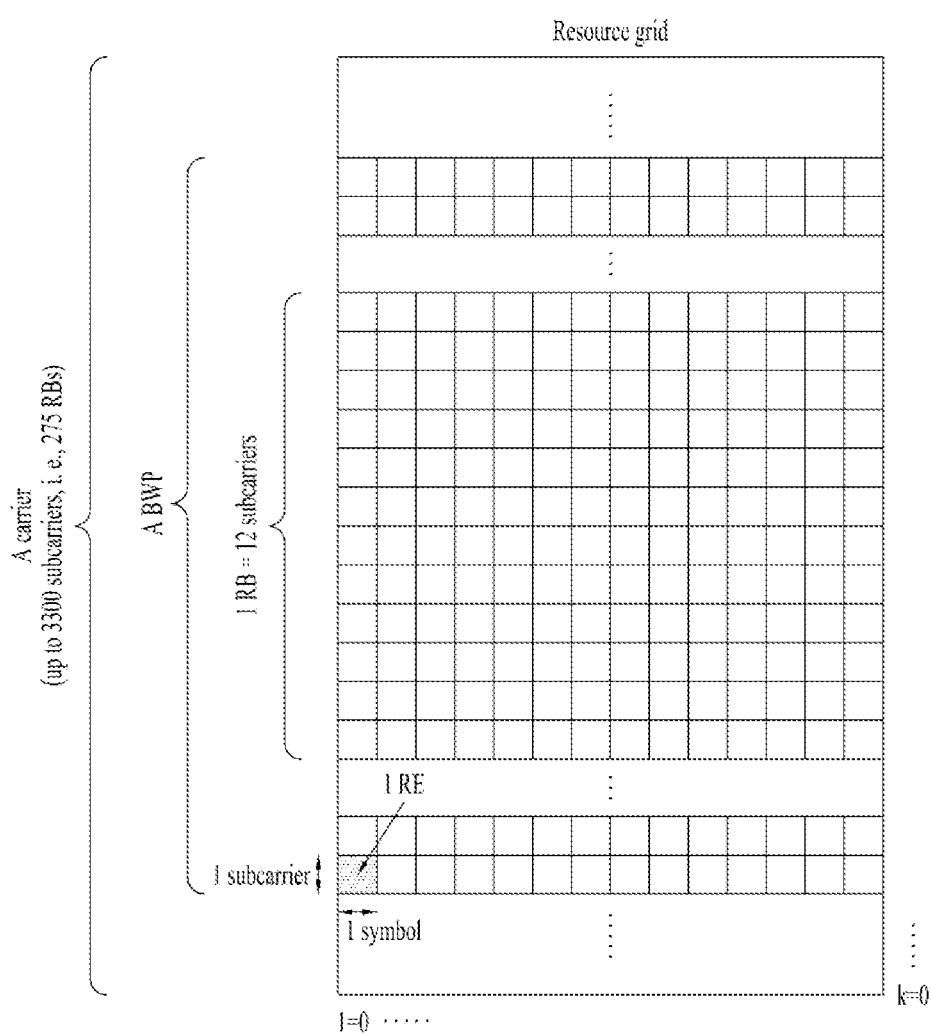
FIG. 3 is a diagram illustrating a slot structure in an NR system to which various embodiments are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
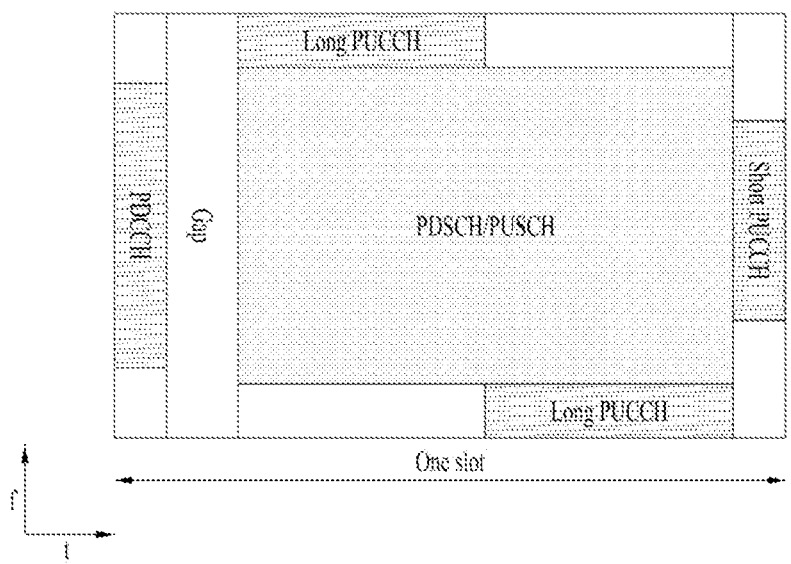
FIG. 4 is a diagram illustrating mapping of physical channels in a slot to which various embodiments are applicable.

FIG. 4 is a diagram illustrating an example of mapping physical channels to a slot to which various embodiments of the present disclosure are applicable.

DL control channel(s), DL or UL data, and UL control channel(s) may all be included in one slot. For example, the first N symbols (hereinafter, referred to as a DL control region) of the slot may be used to transmit a DL control channel, and the last M symbols (hereinafter, referred to as a UL control region) of the slot may be used to transmit a UL control channel. N and M are each an integer greater than or equal to 0. A resource region (hereinafter, referred to as a data region) between the DL control region and the UL control region may be used for DL data transmission or UL data transmission. A time gap for DL-to-UL or UL-to-DL switching may exist between the control region and the data region. A PDCCH may be transmitted in the DL control region, and a PDSCH may be transmitted in the DL data region. Some symbols at the time of switching from DL to UL in the slot may be used as a time gap.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16 QAM), 64 QAM, or 256 QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
|  | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc. |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

2. Various Embodiments

A detailed description will be given of various embodiments based on the above technical ideas. The afore-described contents of Section 1 is applicable to various embodiments described below. For example, operations, functions, terminologies, and so on which are not defined in various embodiments may be performed and described based on Section 1.

Symbols/abbreviations/terms used in the description of various embodiments may be defined as follows.

A/B/C: A and/or B and/or C

DFT: discrete Fourier transform

In description of various embodiments, DFT-S-OFDM may be replaced with single carrier (SC)-OFDM/SC-FDMA or the like.

FFT: fast Fourier transform

IDFT: inverse discrete Fourier transform

IFFT: inverse fast Fourier transform

PAPR: peak-to-average power ratio

OFDM: orthogonal frequency division multiplexing

Sampling frequency: It refers to the number of sampling times per unit time performed to obtain a discrete signal from a continuous signal. For example, the sampling frequency and the sampling time may have an inverse relationship. For example, an SCS may be determined based on the sampling frequency and an FFT size. For example, when a sampling frequency of 30.72 MHz is divided by an FFT size of 2048 in a system in which a sampling frequency of 30.72 MHz is used, an SCS of 15 kHz may be obtained.

Upsampling: refers to a process of extending an input signal in the time domain (and/or the frequency domain). For example, extension of an input signal M times (and/or upsampling M times) may be performed based on padding of M−1 interpolated samples between every two samples. Downsampling may refer to a reverse process of upsampling.

In description of various embodiments, "exceed/greater than A" may be replaced with "greater than/exceed A".

In description of various embodiments, "below/less than B" may be replaced with "less than/below B".

In description of various embodiments, unless otherwise stated, a signal processing procedure of a receiving end/transmitting end may be configured as a reverse of the configuration of a signal processing procedure of the transmitting end/receiving end according to various embodiments, and this may also be included in various embodiments.

Various embodiments may relate to single-carrier-based transmission and reception within a mmWave frequency band.

According to various embodiments, a DFT block size may be limited such that it becomes 1/N (N being an integer/natural number) of the ratio of the DFT block size to an IFFT size (and/or IFFT block size). According to various embodiments, low complexity implementation of a DFT-s-OFDM system can be achieved. For example, the IFFT size may determine a sampling frequency. For example, the IFFT size may be determined based on the sampling frequency. For example, the DFT size may determine the number of allocated subcarriers. For example, the DFT size may be determined based on the number of allocated subcarriers. For example, when spectrum shaping is not specifically defined in the frequency domain, the DFT size and/or the number of allocated subcarriers may correspond to an occupied bandwidth.

According to various embodiments, spectrum shaping may be used through resources other than a region to which a DFT output is mapped. According to various embodiments, a PAPR of a transmission signal may be reduced, and thus, the efficiency of a power amplifier may be increased.

According to various embodiments, a plurality of DFT blocks having a limited size may be used. According to various embodiments, actual frequency use efficiency may be increased.

According to various embodiments, a method of setting the same limit (as the DFT block size) on a resource block size and/or making the resource block size and the DFT block size inconsistent with each other may be provided.

Hereinafter, various embodiments will be described in detail. The various embodiments described below may be combined in whole or in part to constitute various other embodiments unless mutually exclusive, which may be clearly understood by those of ordinary skill in the art.

In the current NR system, system operation is defined only for the frequency band up to 52.6 GHz. Discussion is underway to extend such a system frequency band to a frequency band of 52.6 GHz or higher. In description of various embodiments, a frequency band of 52.6 GHz or higher may be defined as frequency range 4 (FR4).

In the LTE/NR system, downlink transmission is performed based on OFDM/OFDMA (e.g., cyclic prefix (CP)-OFDM) and uplink transmission is performed based on DFT-s-OFDM. This is because the uplink coverage can be extended by applying DFT-s-OFDM with a low PAPR due to characteristics of uplink having a relatively low transmission power compared to a base station.

Figure 5:
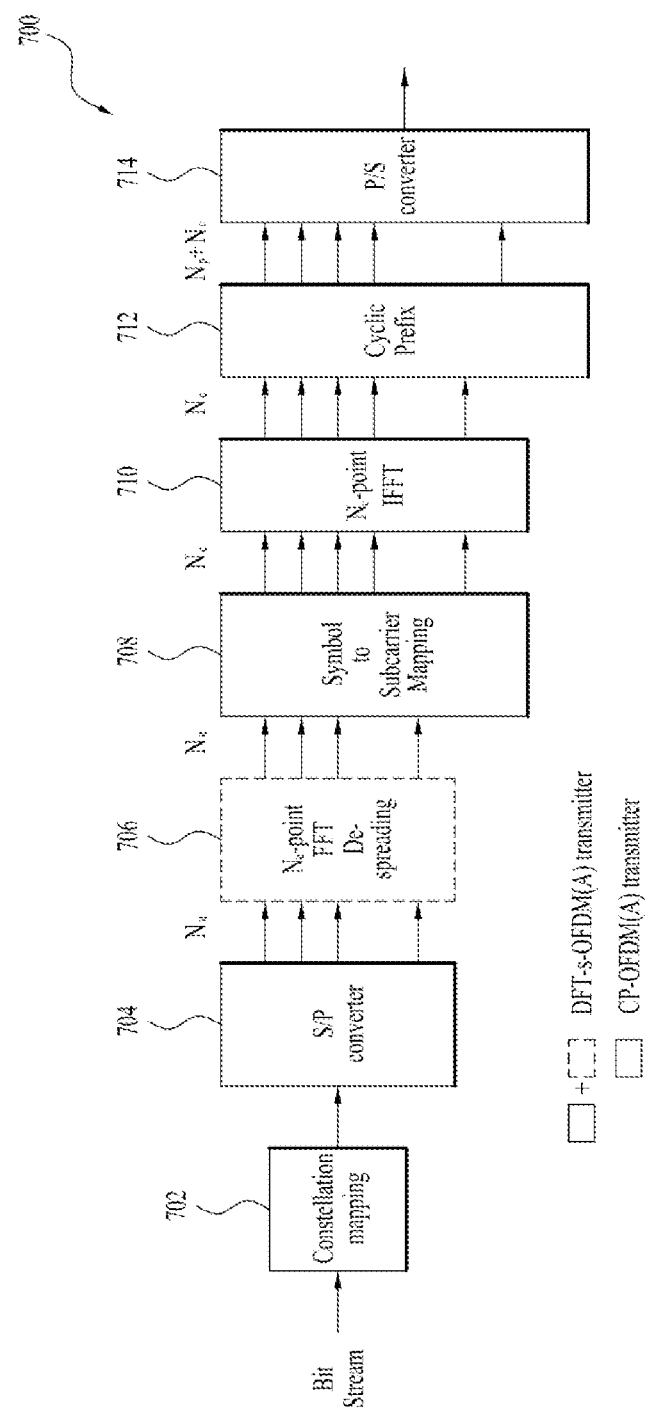
FIG. 5 is a diagram illustrating an example of a structure of a transmitter to which various embodiments are applicable.

FIG. 5 is a diagram illustrating an example of a structure of a transmitter to which various embodiments are applicable.

Figure 6:
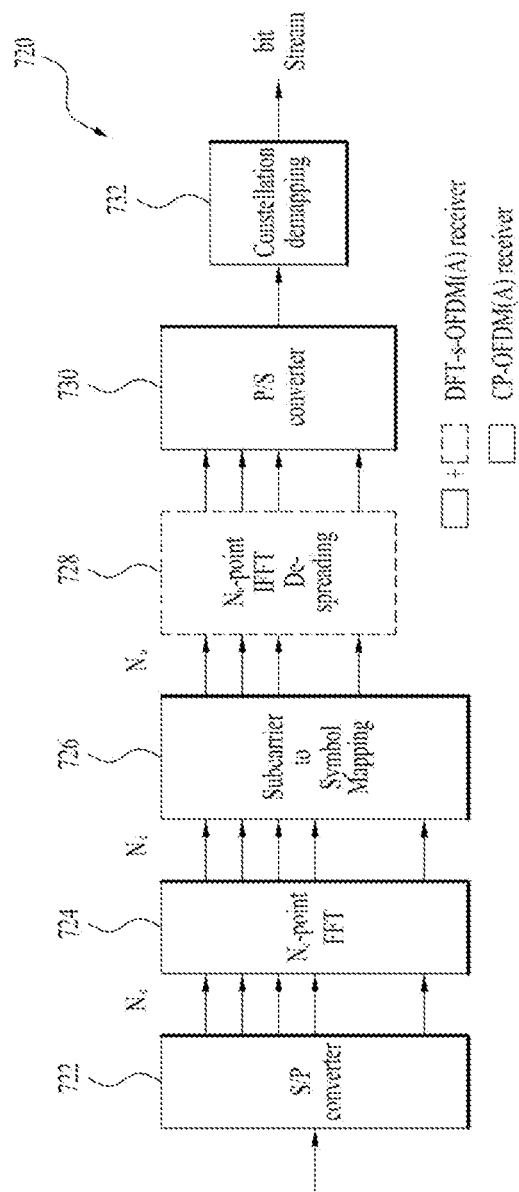
FIG. 6 is a diagram illustrating an example of a structure of a receiver to which various embodiments are applicable.

FIG. 6 is a diagram illustrating an example of a structure of a receiver to which various embodiments are applicable.

A difference between DFT-s-OFDM(A) and OFDM(A) in the transmitter structure is that DFT precoding 706 is applied before IFFT processing 710, and a difference between DFT-s-OFDM(A) and OFDM(A) in the receiver structure is that IFFT postcoding 728 is applied after FFT processing 724. The signal processing in FIGS. 5 and 6 will be described based on DFT-s-OFDM(A), and if signal processing 706 and 728 indicated by dotted lines is omitted, it corresponds to OFDM(A).

Referring to FIG. 5, a bit stream is modulated into a data symbol sequence (702). The serial data symbol sequence is then converted into $N_u$ parallel data symbol sequences (704). The $N_u$-length parallel data symbol sequences are converted into $N_u$-length frequency domain sequences through FFT processing of the same size (706). By processing the signal with a DFT of the same size as the data symbol sequence, the data symbol sequence is converted into consecutive sequences in the frequency domain. FFT processing may be performed through $N_u$-point DFT processing. In description of various embodiments, FFT is used interchangeably with DFT, and DFT processing is used interchangeably with DFT spreading or DFT precoding. Thereafter, the $N_u$-length frequency domain sequences are mapped to $N_u$ subcarriers allocated among $N_c$ subcarriers, and 0 is padded to the remaining $N_c-N_u$ subcarriers (708). The sequences mapped to the $N_c$ subcarriers are converted into time-domain sequences having a length of $N_c$ through $N_c$-point IFFT processing (710). In order to reduce ISI and ICI, a CP is constructed by copying the last $N_p$ samples from the time-domain sequences and adding them to the beginning of the sequences (712). The generated time-domain sequences correspond to one transmission symbol and are converted into a serial sequence through a parallel/serial converter (S714). Thereafter, the serial sequence is transmitted to a receiving end through frequency up-conversion or the like. Another user transmits data by being allocated available subcarriers from among the $N_c-N_u$ subcarriers remaining after being used by the previous user.

Referring to FIG. 6, a receiving end 720 includes a serial/parallel converter 722, an $N_c$-point FFT module 724, a subcarrier-to-symbol mapping module 726, a $N_u$-point DFT despreading module 728, a parallel/serial converter 730, and a constellation demapping module 732. Since the signal processing procedure of the receiving end 720 is the reverse to that of the transmitting end 700, refer to FIG. 5 and related description for details.

In general, as a radio frequency (RF) increases to a high frequency band, radio wave characteristics such as signal magnitude attenuation characteristics and characteristics of a device implementing the same may become considerably different. In particular, as the frequency increases, the efficiency and phase noise characteristics of an amplifier such as a power amplifier may considerably deteriorate.

In order to alleviate such problems, a single-carrier transmission system rather than a multi-carrier transmission system such as OFDM has an advantage in terms of system implementation in the FR4 band. For example, as the frequency band in which the system operates, such as the FR4 band, increases, application of a waveform with a low PAPR to downlink may be considered when the linearity of the power amplifier is considered in terms of transmission of a base station as well as a UE. Therefore, according to various embodiments, DFT-s-OFDM may be considered as an example of a single carrier transmission system as a (downlink/uplink) transmission method in the FR4 band.

Figure 7:
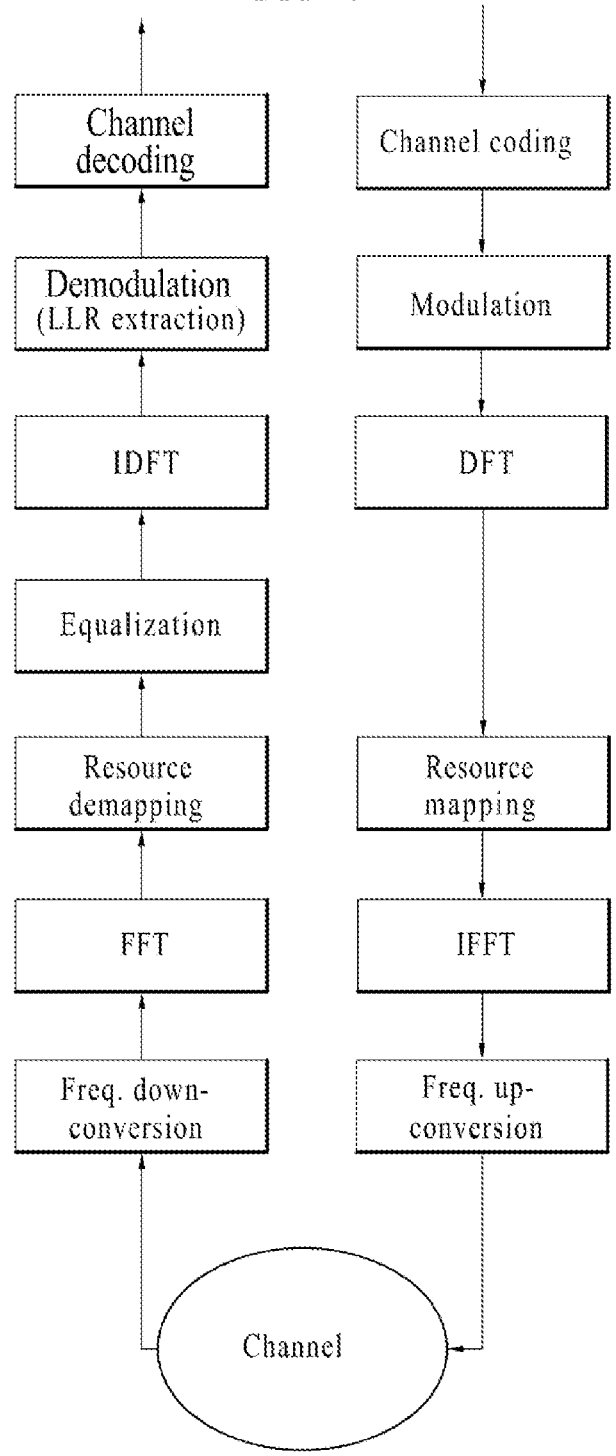
FIG. 7 is a diagram illustrating an example of a DFT-s-OFDM system to which various embodiments are applicable.

FIG. 7 is a diagram illustrating an example of a DFT-s-OFDM system to which various embodiments are applicable. FIG. 7 shows an example of a transmission/reception structure of a general DFT-s-OFDM system applicable to various embodiments.

Referring to FIG. 7, a bit stream and/or a signal may be channel-coded and modulated to be DFT-precoded in a transmitting end, resource mapping is performed on the DFT-precoded signal, IFFT is performed thereon, frequency up-conversion is performed therein, and the resultant signal is transmitted through a channel. Signal processing at a receiving end may be configured as a reverse of the process at the transmitting end. After frequency down-conversion is performed on the signal received through the channel at the receiving end, FFT may be performed thereon, resource demapping may be performed thereon, and then an equalization operation may be performed thereon. IDFT may be performed on a recovered signal according to equalization, demodulation (e.g., log-likelihood ratio (LLR) extraction or the like) may be performed thereon, and then channel decoding may be performed to obtain the bit stream and/or the signal at the receiving end.

In the DFT-s-OFDM system, a DFT-precoded signal may be mapped to the frequency domain to be transmitted, and then IFFT is performed thereon, and a configured baseband signal may be frequency up-converted and transmitted.

A receiver may perform reception through a reverse process of a transmission process. For example, in the reception process, an equalization operation for removing interference between signals distorted through a channel may be performed. For efficient implementation of an equalizer, the equalization operation and the like may be performed in the frequency domain. For example, a process of performing equalization after FFT and obtaining a modulated symbol through DFT with respect to a recovered signal may correspond thereto. This is because, when a delay profile of a channel is long, equalization in the time domain (and/or the time domain and/or the time axis) requires a very large matrix operation and thus it is inefficient to implement equalization.

When equalization is implemented in the frequency domain (and/or frequency domain and/or frequency axis) in a multi-carrier system, only 1-tap equalization may be performed per subcarrier. In DFT-s-OFDM, equalization in the frequency domain may also be implemented in this way.

Figure 8:
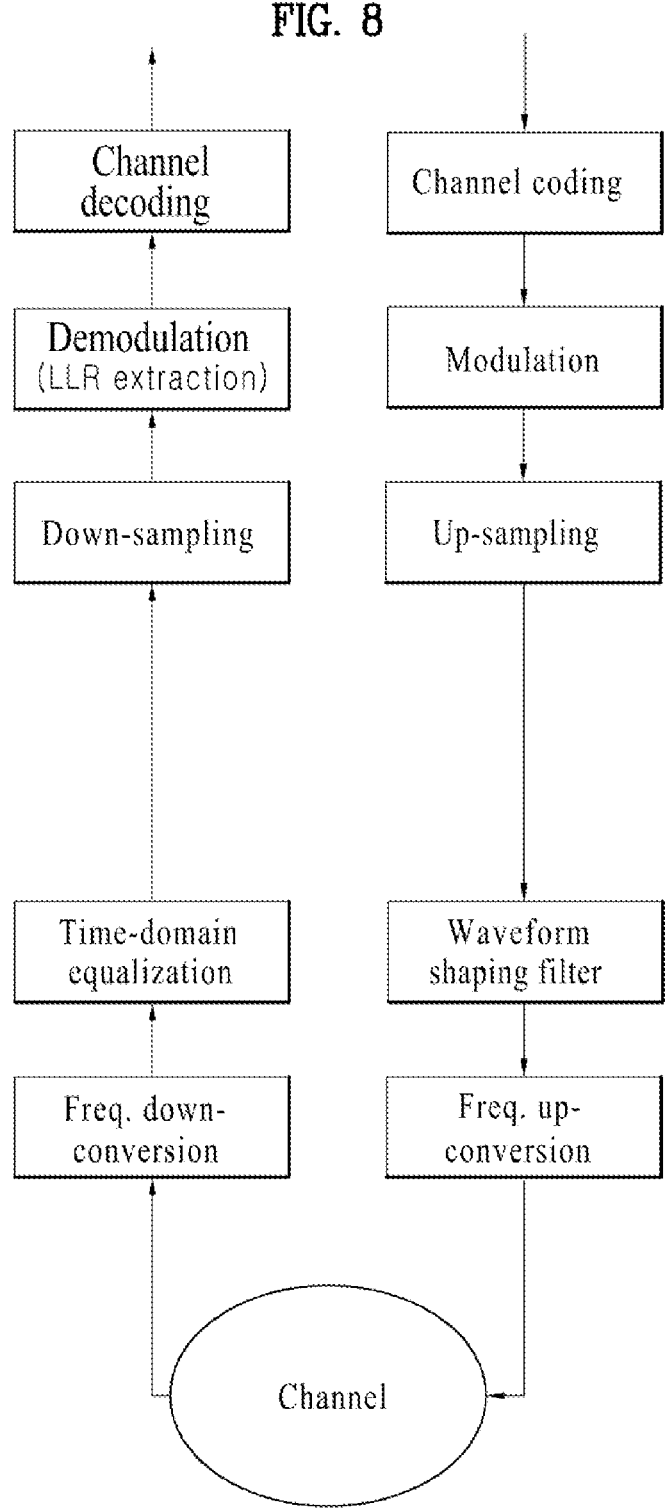
FIG. 8 is a diagram illustrating an example of a DFT-s-OFDM system according to various embodiments.

2.1. (1) Numerology for Low-Complexity Transceiver Implementation in DFT-s-OFDM System FIG. 8 is a diagram illustrating an example of a DFT-s-OFDM system according to various embodiments. FIG. 8 shows an example of a transmission/reception structure of a DFT-s-OFDM system having low complexity according to various embodiments.

Referring to FIG. 8, according to various embodiments, in a transmitting end, a bit stream and/or a signal may be channel-coded and modulated to be upsampled, a waveform shaping filter may be applied to the upsampled signal, frequency up-conversion may be performed thereon, and then the resultant signal may be transmitted through a channel.

According to various embodiments, a signal processing procedure at a receiving end may be configured as a reverse process to that of the transmitting end. In the receiving end, after frequency down-conversion of the signal received through the channel, time-domain equalization may be performed thereon, downsampling may be performed thereon, demodulation (e.g., LLR extraction or the like) may be performed thereon, and then channel decoding may be performed to obtain the bit stream and/or the signal.

In the transmission/reception structure of FIG. 8 according to various embodiments, in contrast to the transmission/reception structure of FIG. 7, a series of operations/functions corresponding to DFT, resource mapping, and/or IFFT may be replaced with a series of operations/functions such as upsampling and/or a waveform shaping filter in the transmitter, and a series of operations/functions corresponding to resource demapping, equalization and/or IDFT may be replaced with a series of operations/functions such as time-domain equalization and/or downsampling in the receiver.

For example, in a mobile communication channel environment, a transmitted radio wave may be received through various paths, and thus a delay profile of several to tens of samples may be generated. Accordingly, it may be required to remove intersymbol interference caused by multipath propagation with respect to a received signal, and an equalizer may perform removal of intersymbol interference.

For example, when equalization is performed in the time domain in a single-carrier system, the amount of matrix computation greatly increases in proportion to a delay profile and complexity may increase. In order to solve the problems of increased computational amount and complexity, it may be considered that equalization is performed in the frequency domain as shown in FIG. 7.

For example, according to a frequency-domain equalizer (frequency-domain equalizer, FD-equalizer/FD-equalization), an operation corresponding to FFT/IDFT is additionally performed but an equalizer is implemented in a 1-tap form for each subcarrier, and thus a large amount of matrix operation can be eliminated.

For example, since the magnitude of the FFT/IDFT operation necessary for the FD-equalizer is small compared to the magnitude of the matrix operation necessary for the time-domain equalizer (TD-equalizer/TD-equalization), the FD-equalizer may exhibit more advantageous characteristics than the TD-equalizer in terms of complexity.

For example, when the frequency increases, such as mmWave, the pathloss according to the distance increases, and thus a transmitting/receiving method using a narrow beam in the space through beamforming to secure coverage may be considered. Further, for example, a high-frequency band signal such as mmWave may exhibit propagation characteristics in which signal attenuation due to reflection and transmission is very large.

Due to these characteristics, in the FR4 band or the like in which various embodiments are mainly considered, rich scattering characteristics such as a low frequency band may not be exhibited and thus the delay profile may be very short. Therefore, in the FR4 band or the like, for example, the amount of matrix computation necessary for the TD-equalizer decreases, and a reverse phenomenon in which the amount of FFT/IDFT computation of the FD-equalizer increases may occur. In addition, in a high-frequency band such as mmWave, a data rate may considerably increase because communication is performed through a broadband. For example, in a system having such a very high data rate, the amount of computation of a receiver may act as a very important factor in system implementation. In particular, in such an environment, it can be advantageous to use the TD-equalizer rather than the FD-equalizer unlike a case in a low frequency band.

For example, when the TD-equalizer is executed, channel decoding may need to be performed using samples obtained by executing the TD-equalizer. To this end, for example, a sample obtained through the TD-equalizer may need to correspond to a modulated symbol generated at a transmitting end.

However, when the conventional numerology is used, for example, the output of the TD-equalizer may show that a modulated symbol is sampled at a position where the modulated symbol is not zero-crossing with an adjacent symbol. For example, in the case of an LTE system having a 20 MHz band, the size of IFFT is 2048 but the number of subcarriers actually used for signal transmission and reception thereamong may be 1200. For example, in such a numerology case, 1200 modulated symbols can appear over 2048 samples by the TD-equalizer. Accordingly, there may be problems that modulated symbols need to be obtained through IDFT with respect to samples of the TD-equalizer, and IDFT needs to be performed for every OFDM symbol.

According to various embodiments, the size of the DFT (and/or IDFT) block can be limited to a specific value such that the above-described problems can be solved. According to various embodiments, modulated symbols can be obtained through down sampling without performing IDFT, and thus complexity can be reduced.

According to various embodiments, for example, when 1024 is used as a DFT (and/or IDFT) block size (the number of subcarriers used for transmission of a modulated symbol at the transmitting end) with respect to an IFFT (and/or FFT) block size of 2048, downsampling in the time domain is performed (and/or downsampling is performed and then equalization in the time domain is performed) instead of IDFT for samples obtained from the output of the TD-equalizer, and thus a receiver with reduced complexity can be implemented.

According to various embodiments, in the same manner for the transmitter, operations/functions corresponding to DFT, resource mapping and/or IFFT may be replaced with upsampling and/or waveform shaping filtering operations/functions, and thus a transmitter with reduced complexity can be implemented.

According to various embodiments, for low-complexity implementation of a DFT-s-OFDM system, a DFT block size (e.g., this can determine the number of allocated subcarriers, and in particular, if spectrum shaping or the like is not defined in the frequency domain, for example, this may correspond to an occupied bandwidth) may be limited such that the ratio of the DFT block size to an IFFT size (for example, this can determine a sampling frequency) becomes 1/N (N being an integer, a non-zero integer, or a natural number). For example, the DFT block size corresponding to an IFFT size of 2048 may be one or more of 2048, 1024, 512, 256, 128, 64, 32, 16, 8, 4, 2, 1, and the like.

According to various embodiments, the DFT block size may be dynamically changed. For example, according to various embodiments, the DFT block size may be dynamically changed while the above-described condition (1/N condition) is satisfied.

According to various embodiments, information on the DFT block size may be transmitted/received through a control channel carrying scheduling information (e.g., DCI in LTE/NR). According to various embodiments, a maximum DFT block size and/or a configurable set may be configured for a UE in a call setup stage and/or the maximum DFT block size and/or the configurable set may be predefined such that the UE can preset a sampling frequency and/or a filter set configuration for downsampling.

According to various embodiments, when the aforementioned system parameters are used, a frequency band effectively used by the system may be limited. For example, if a carrier assigned a frequency of 320 MHz uses the numerology of {240 kHz SCS, 2048 IFFT size (sampling frequency: 491.52 MHz), 1024 DFT block size (the number of allocated subcarriers: 1024), occupied bandwidth: 245.76 MHz}, the frequency use efficiency can be about 76.8% (=245.76/320). According to various embodiments, a method of obtaining an additional system gain and/or increasing frequency use efficiency by using an extra frequency band for a system having low complexity may be considered.

2.2. (2) PAPR Reduction Through Spectrum Shaping

Figure 9:
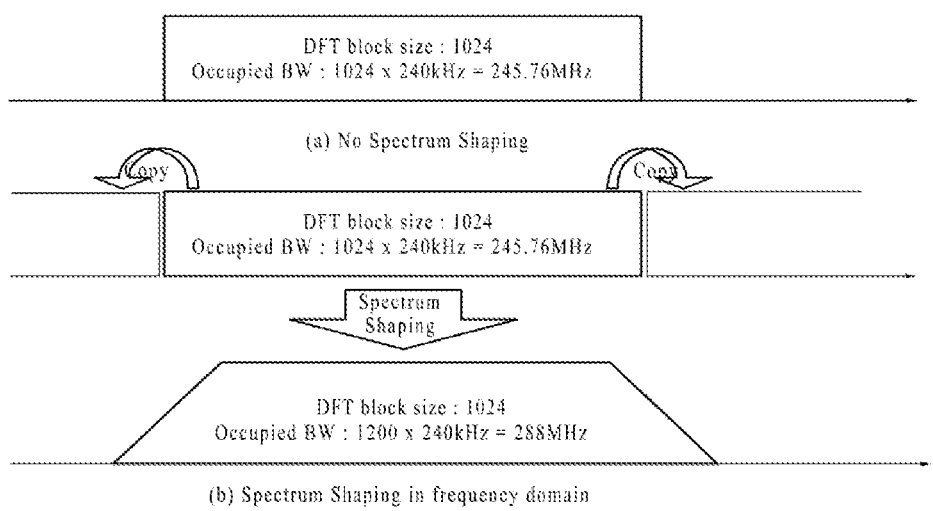
FIG. 9 is a diagram illustrating an example of spectrum shaping according to various embodiments.

FIG. 9 is a diagram illustrating an example of spectrum shaping according to various embodiments. FIG. 9 shows an example of frequency domain spectrum shaping of a DFT-s-OFDM system according to various embodiments. In FIG.

9, it may be understood that the x-axis is the frequency domain and the y-axis is an amplitude.

A spectrum shaping method for increasing frequency use efficiency in a case where numerology according to the above-described various embodiments is set may be provided.

Referring to FIG. 9(a), according to various embodiments, when spectrum shaping is not applied, for example, if a carrier assigned a frequency of 320 MHz uses numerology of {240 kHz SCS, 2048 IFFT size (sampling frequency: 491.52 MHz), 1024 DFT block size (the number of allocated subcarriers: 1024), and occupied bandwidth: 245.76 MHz}}, the frequency use efficiency can be about 76.8% (=245.76/320).

Referring to FIG. 9(b), when spectrum shaping is applied, for example, the frequency use efficiency of a carrier using the above-described numerology can be about 90% (=288/320), and thus the frequency use efficiency can be increased as compared to a case in which spectrum shaping is not applied.

According to various embodiments, for a case in which a band except for a guard band for an adjacent frequency band is larger than the number of allocated subcarriers defined above, the actual system may use spectrum shaping (e.g., spectrum shaping such as triangular shaping) in the frequency domain to reduce a PAPR of a transmitted signal, thereby increasing the efficiency of a power amplifier.

According to various embodiments, a symbol is copied to the remaining region, and spectrum shaping may be performed based thereon. For example, in an actual system, at least some of symbols corresponding to 1024 are copied to at least a part of a band except for a guard band for an adjacent frequency band, and spectrum shaping may be performed based thereon.

For example, as a filter for spectrum shaping, a Hamming window, a squared root-raised cosine (SRRC) filter, or the like may be used, unlike the example shown in FIG. 9.

Figure 10:
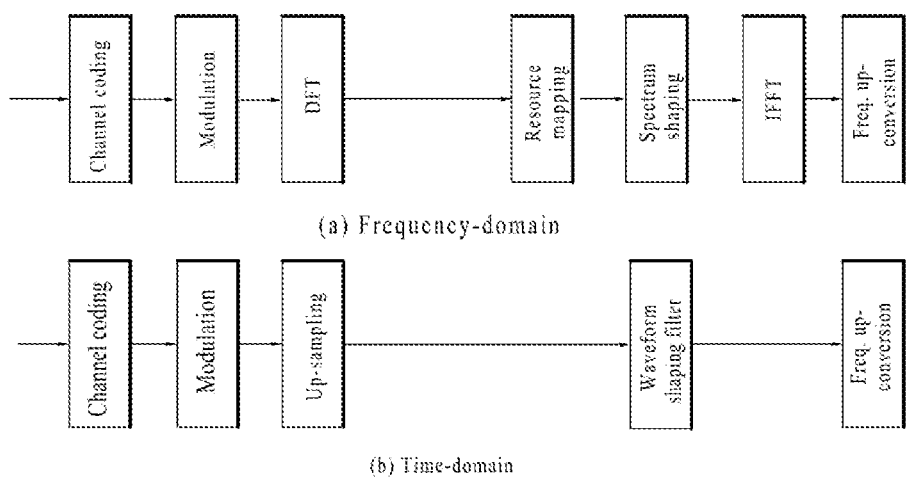
FIG. 10 is a diagram illustrating an example of a spectrum shaping implementation according to various embodiments.

FIG. 10 is a diagram illustrating an example of a spectrum shaping implementation according to various embodiments.

Referring to FIG. 10(a), according to various embodiments, when a spectrum shaping filter is used, spectrum shaping as shown in FIG. 9 may be performed on DFT output, which may be implemented in the frequency domain. According to various embodiments, in a transmitting end, a bit stream and/or a signal may be channel-coded and modulated to be DFT-precoded, and after resource mapping is performed on the DFT-precoded signal, spectrum shaping may be performed thereon, IFFT may be performed thereon, and then the resultant signal may be frequency up-converted and transmitted.

Referring to FIG. 10(b), according to various embodiments, a spectrum shaping filter may be implemented in the time domain. According to various embodiments, a bit stream and/or a signal may be channel-coded, modulated and upsampled in the transmitting end, and then the shaping filter may be applied thereto and then the resultant signal may be frequency-up-converted and transmitted. For example, this operation may be structurally the same as that of the transmitter when frequency domain spectrum shaping is not used, as illustrated in FIG. 8. For example, the waveform shaping filter may be configured such that a spectrum shaping response defined in the frequency domain is reflected.

According to various embodiments, since spectrum shaping is used, the actual frequency use efficiency is the same, but the frequency spectrum occupancy is increased, thereby reducing a PAPR of a transmitted signal and increasing the efficiency of the power amplifier.

2.3. (3) Increase in Frequency Use Efficiency Through Multiple DFT Blocks

In (2) according to the above-described various embodiments, the method of increasing the efficiency of the power amplifier by reducing a PAPR without increasing the actual frequency use efficiency although an extra frequency band is used has been described.

In this section, a method of actually increasing frequency use efficiency by using a plurality of DFT blocks having a DFT block size limitation according to the various embodiments described above is described.

For example, when the DFT block size is limited for low complexity as described above, for example, a frequency efficiency of about 77% may be obtained in the case of a 2048 IFFT block size and a 1024 DFT block size. According to various embodiments, a method capable of further increasing such frequency efficiency may be provided.

According to various embodiments, there may be a plurality of DFT blocks corresponding to one IFFT block. For example, if the frequency band available in the system is wider (than the allocated bandwidth/frequency region corresponding to the allocated number of subcarriers), an additional DFT block may be used for the remaining frequency band (other than the frequency region corresponding to the allocated number of subcarriers) to generate a transmission signal, and a signal in the frequency domain obtained through two DFT blocks (and/or two or more DFT blocks) may be mapped to another frequency domain and transmitted, which improves the frequency efficiency.

According to various embodiments, the size of each DFT block may be set such that the condition according to the above-described various embodiments (the condition that the DFT block size is set such that the ratio of the DFT block size to the IFFT size (determining the sampling frequency) becomes 1/N) is satisfied, and thus low complexity of the receiver can be maintained. For example, if the IFFT size is 2048, the DFT block size corresponding to each of the multiple DFT blocks may be one or more of 2048, 1024, 512, 256, 128, 64, 32, 16, 8, 4, 2, and 1. For example, the sum of the sizes of the multiple DFT blocks may be less than or equal to the size of the allocated bandwidth. For example, when the number of subcarriers used is 1200, the sum of the sizes of the multiple DFT blocks may be 1200 or less.

FIG. 11 is a diagram illustrating an example of a transmission method using multiple DFT blocks according to various embodiments.

Referring to FIG. 11(a), according to various embodiments, when the IFFT block size is 2048, a DFT block size K1=1024 and a DFT block size K2=256 may be set, and thus low complexity of a UE can be maintained.

According to various embodiments, in the transmitting end, bit streams and/or signals to be input to different DFT blocks (DFT block having a size of K1 and DFT block having a size of K2) may be channel-coded and modulated, input to different DFT blocks (DFT block having a size of K1 and DFT block having a size of K2), and DFT-precoded, and after resource mapping is performed on the output of each DFT block, IFFT may be performed thereon and the resultant signals may be frequency up-converted and transmitted through a channel. For example, according to resource mapping, a resource location in a frequency domain corresponding to DFT block #1 and a resource location in a frequency domain corresponding to DFT block #2 may be preset. For example, the output of DFT block #1 (and/or K1 samples corresponding to DFT block #1) and the output of DFT block #2 (and/or K2 samples corresponding to DFT block #2) may be mapped contiguously and/or discontinuously in the frequency domain.

Referring to FIG. 11(b), according to various embodiments, when various embodiments are implemented in the time domain without DFT/IFFT, the mapping operation in the frequency domain may be implemented as frequency shifting.

According to various embodiments, each bit stream and/or signal to be frequency-shifted in the transmitting end may be channel-coded, modulated and upsampled, a waveform shaping filter may be applied thereto, and frequency shift may be applied thereto. According to various embodiments, after the frequency-shifted signals are summed, frequency up-conversion may be applied thereto.

According to various embodiments, the DFT block size (e.g., K1 and K2 in FIG. 11) may be semi-statically set by RRC configuration and/or may be dynamically indicated through a control channel according to the amount of data transmitted.

According to various embodiments, in consideration of ease of UE implementation, in the case of dynamic indication, the center frequency in the transmitted frequency region may be semi-statically set even if the DFT block size is variable.

According to various embodiments, a frequency region to which each DFT block is mapped may be preset through the above-described setting method. According to various embodiments, a DFT block mapped to a region through which a UE receives a signal may be semi-statically set according to a traffic load state of the UE and/or may be dynamically indicated through a control channel. According to various embodiments, signals may be simultaneously received through two DFT block sizes (and/or two or more DFT block sizes) according to UE capability.

2.4. (4) Resource Block (RB) Size 2.4.0. (4-0)

For example, when a base station performs packet scheduling in order to provide a service to a UE, resources may be variably allocated depending on the amount of data to be transmitted to the UE.

For example, in the case of DFT-s-OFDM, TDM (which may mean a method of allocating only a part to a UE at the front end of a DFT block) and/or FDM (which is a method of varying a frequency band allocated on a frequency and may mean varying the DFT block size) may be performed.

For example, when the DFT block size is changed according to the amount of data to be transmitted to the UE, as in FDM, a resource block (RB) may be defined and a method of allocating resources in units of RBs may be used in LTE and/or NR systems.

As mentioned in (1) according to the various embodiments described above, for low complexity implementation of a DFT-s-OFDM transceiver, the ratio of a sampling frequency to an allocated bandwidth obtained from the number of allocated subcarriers may be set such that it is maintained at an integer ratio of 1/K (K may be an integer/non-zero integer/natural number).

According to various embodiments, the size of the resource block also satisfies this constraint (e.g., the ratio of the sampling frequency to the frequency bandwidth of the RB may be 1/K (K being an integer/non-zero integer/natural number), and thus dynamic RB allocation can be performed. According to various embodiments, when the sampling frequency is set such that the IFFT size becomes $2^n$ ($2^n$), the number of subcarriers constituting the RB may be defined such that it becomes the power of 2 ($2^m$, $2^{m'}$) (m and n being integers equal to or greater than 0). According to various embodiments, it is possible to implement low complexity of a DFT-s-OFDM system transceiver and to enable operation resource allocation.

2.4.1. (4-1)

In (4-0) according to the above-described various embodiments, limiting the DFT/IDFT block size for implementation of low complexity of a DFT-s-OFDM system transceiver and/or limiting the RB size in the same manner for operation resource allocation according thereto have been described.

In this section, considering that one RB is composed of 12 subcarriers in the conventional LTE and/or NR system, a method of further reducing system complexity by accomplishing implementation of low complexity of a DFT-s-OFDM system transceiver without changing the numerology of the conventional system for the RB is described.

According to various embodiments, for example, a method of interpreting the actual number of effective subcarriers corresponding to RBs allocated according to a method defined/set/appointed in advance between a base station and a UE while maintaining the size of the RB as a size according to the conventional LTE and/or NR system may be provided.

Method A

According to various embodiments, the RB size is maintained at 12 (subcarriers), and the method in (1) according to the various embodiments described above may be applied to the DFT block size. However, according to various embodiments, the DFT block size may not be the same as the size of the number of allocated RBs (and/or subcarriers), unlike a case in the conventional LTE and/or NR systems. For example, a smallest value satisfying the method according to the various embodiments described above in (1) among values larger than the number of allocated RBs (and/or subcarriers) may be adopted as the DFT block size.

For example, when 85 RBs are allocated, the number of allocated subcarriers is 85*12=1020, but the DFT block size is not 1020 and may be 1024 among numbers larger than 1020 through the method according to the various embodiments described above in (1).

According to various embodiments, the DFT block size may differ from the size of a symbol input as a DFT input. According to various embodiments, one or more of the following methods may be considered to match these (that is, to match the DFT block size and the size of a symbol input as a DFT input).

1) Zero padding may be performed on the remaining region. For example, 1024−1020=4 symbols are selected, and zero padding may be performed on the selected 4 symbols (e.g., 0-bit data may be filled in the 4 symbols).
2) Some symbols may be repeatedly transmitted for the remaining region. For example, 1024−1020=4 symbols may be selected from 1020 symbols and the selected 4 symbols may be repeatedly transmitted.
3) The remaining region may be filled through (spectrum) shaping. For example, after symbols are copied as in FIG. 9, the remaining region may be filled through shaping.
4) Additional information other than data symbols may be transmitted in the remaining region, and/or reference signals and/or known symbols/sequences may be filled and transmitted in the remaining region. For example, when transmission is performed in this way, the frequency region allocated to the actual frequency may be the region occupied by 1024 subcarriers because the DFT output is 1024.

Method B

According to various embodiments, the resource block size may be maintained as 12 (subcarriers) and the method according to the various embodiments described above in (1) may be applied to the DFT block size. However, according to various embodiments, the DFT block size may not be the same as the number of allocated RBs (and/or subcarriers), unlike a case in conventional LTE and/or NR systems, and a largest value satisfying the method according to the various embodiments described above in (1) among values smaller than the number of allocated RBs (and/or subcarriers) may be adopted as the DFT block size, for example.

For example, the number of symbols input to actual DFT may be limited by the DFT size. According to various embodiments, one or more of the following methods may be considered in consideration of the fact that a signal output from DFT becomes smaller than the number of actually allocated subcarriers.

1) Zero padding may be performed on the remaining region.
2) Spectrum shaping as in the example of FIG. 9 may be performed using the remaining region.

For example, when 90 RBs are allocated, 90*12=1080 subcarriers are allocated, but the number of subcarriers used for actual transmission and reception may be 1024 among values smaller than 1080 according to the method proposed in (1). In this case, since the DFT size becomes 1024, for example, the signal output from DFT may be mapped to the 1080 subcarriers, and zero padding may be performed on 56 subcarriers and/or a PAPR reduction effect can be obtained through spectrum shaping as in the example of FIG. 9.

Method C

According to various embodiments, the RB size may be maintained as 12 (subcarriers), and the method according to the various embodiments described above in (1) may be applied to the DFT block size. However, according to various embodiments, the DFT block size may not be the same as the number of allocated RBs (and/or subcarriers), unlike a case in the conventional LTE and/or NR systems, as in method A. For example, the largest value satisfying the method according to the various embodiments described above in (1) among values smaller than the number of allocated RBs (and/or subcarriers) (hereinafter referred to as X) may be adopted as the DFT block size.

In addition, according to various embodiments, when the number of RBs occupied on the frequency (hereinafter referred to as Y) is additionally indicated, the signal output from DFT is mapped to Y RBs as in method B, and one or more of the following methods may be considered because the number of DFT outputs is small.

1) Zero padding may be performed on this region (remaining region).
2) Spectrum shaping as in the example of FIG. 9 may be performed using the remaining region.

2.5. (5) Control Channel

According to various embodiments, for implementation of low complexity of a DFT-s-OFDM system, it may be desirable to transmit/receive a control channel through a DFT block size and/or a frequency region set such that the constraints according to the various embodiments described above in (1) are satisfied.

For example, in the case of an NR system, a control channel may be transmitted and received in a control resource set (CORESET), which is a resource region for control channel transmission, and the DFT/IDFT block size may correspond to the size of a frequency region constituting the CORESET.

For example, when a control channel is transmitted and received through such settings, the frequency bandwidth of CORESET needs to be set within a preset maximum DFT/IDFT block size as in the various embodiments described above in (1).

For example, depending on UE capability, it may be desirable that the frequency region of a set data channel have the same center frequency as a frequency region in which a control channel is transmitted and received (frequency region constituting CORESET), and only a value smaller than the DFT/IDFT block size for transmission/reception of the control channel and/or a preset maximum DFT block size be indicated as a DFT/IDFT block size for the data channel. This is because buffering is performed on a signal after equalization, and modulated symbols can be obtained through downsampling (filtering and/or decimation) performed on the buffered depending on the DFT block size indicated by DCI.

Figure 12:
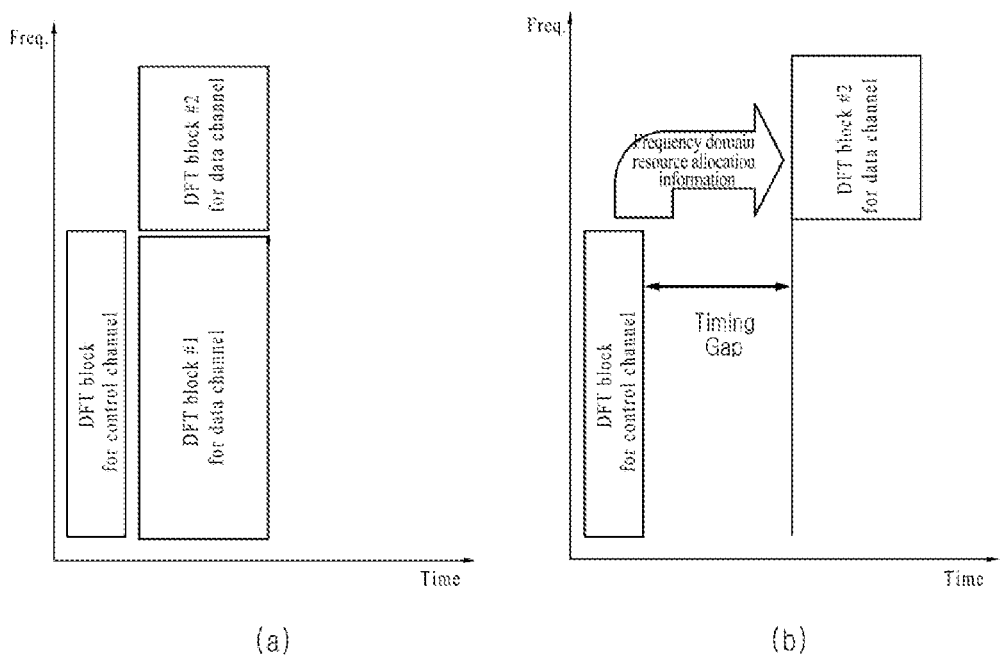
FIG. 12 is a diagram illustrating an example of a configuration of a control channel and a data channel according to various embodiments.

FIG. 12 is a diagram illustrating an example of a configuration of a control channel and a data channel according to various embodiments.

Referring to FIG. 12, according to various embodiments, when resources for transmission and reception of the control channel are configured in a frequency band different from that of the data channel, contrary to what was mentioned above (which may occur when the frequency band in which the control channel is transmitted and received and the frequency band for transmission and reception of the data channel are configured differently, for example, the data channel is configured through a plurality of DFT/IDFT blocks (DFT/IDFT block #1 for the data channel and DFT/IDFT block #2 for the data channel) for transmission and reception of the data channel as in the various embodiments according to (3), but the control channel is configured through only one DFT/IDFT block. Refer to FIG. 12(a), the plurality of DFT/IDFT blocks for the data channel may be configured within one carrier), information about the frequency band (frequency domain resource allocation information) as well as a DFT block size for transmission of the data channel may be known through the control channel.

According to various embodiments, a timing gap for reconfiguring an RF component may be required depending on the UE capability (refer to FIG. 12(b)).

For example, in the configuration of FIG. 12(a), the size of the DFT/IDFT block for the control channel may match the maximum size of DFT block #1 for the data channel.

For example, in the configuration of FIG. 12(b), the DFT/IDFT block for the control channel and DFT/IDFT block #2 for the data channel may be configured at different frequency resource locations within one carrier.

Figure 13:
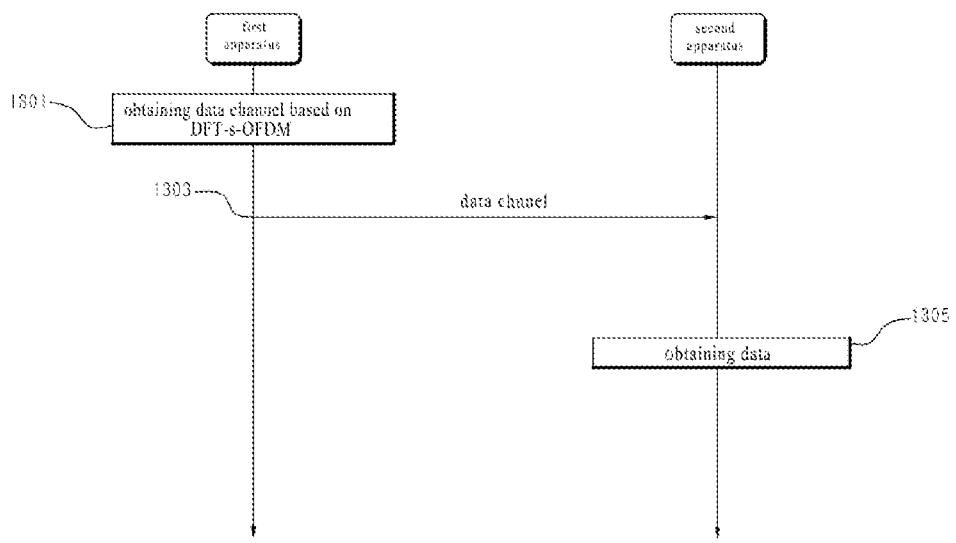
FIG. 13 is a diagram briefly illustrating operating methods of a first apparatus and a second apparatus according to various embodiments.

FIG. 13 is a diagram briefly illustrating an operating method of a first apparatus and a second apparatus according to various embodiments.

Figure 14:
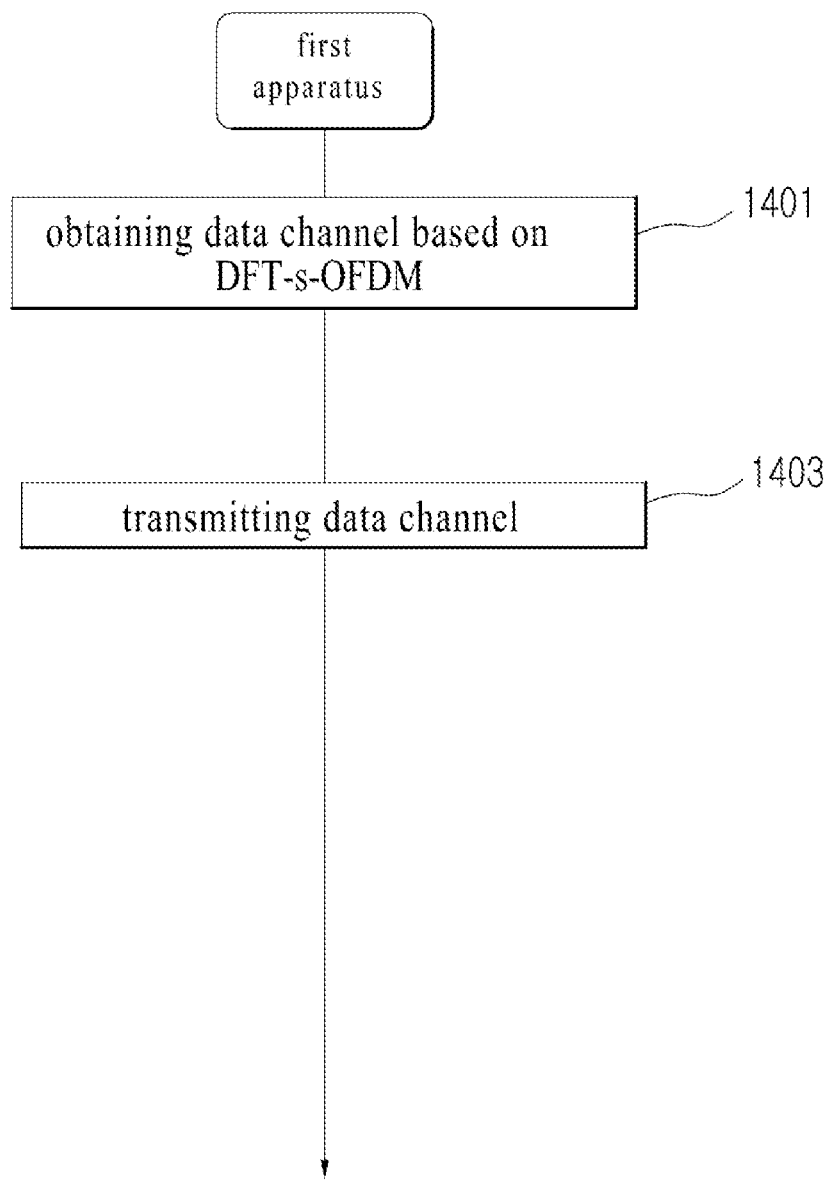
FIG. 14 is a flowchart illustrating the operating method of the first apparatus according to various embodiments.

FIG. 14 is a flowchart illustrating an operating method of the first apparatus according to various embodiments.

Figure 15:
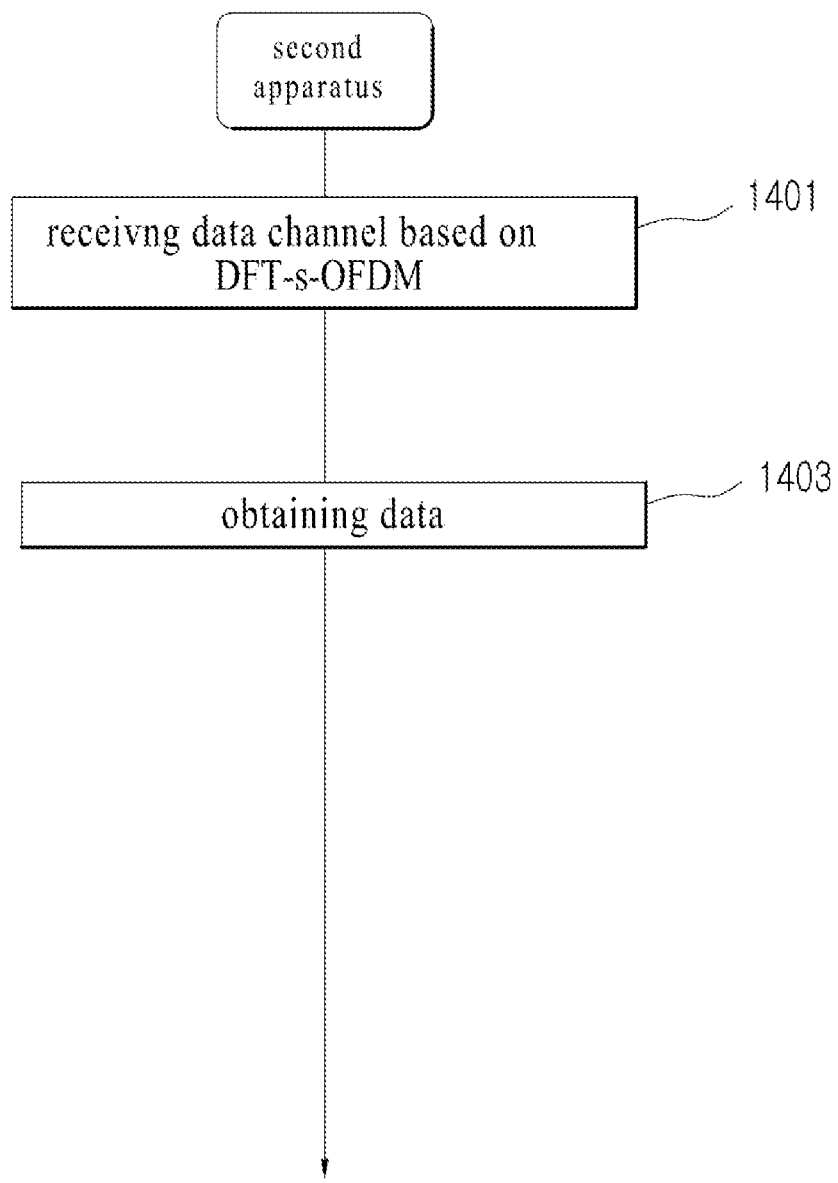
FIG. 15 is a flowchart illustrating the operating method of the second apparatus according to various embodiments.

FIG. 15 is a flowchart illustrating an operating method of the second apparatus according to various embodiments.

For example, the first apparatus may be a base station/UE and the second apparatus may be a UE/base station.

Referring to FIGS. 13 to 15, in operations 1301 and 1401 according to various embodiments, the first apparatus may acquire/generate a data channel based on DFT-s-OFDM.

In operations 1403 and 1503 according to various embodiments, the first apparatus may transmit the data channel, and the second apparatus may receive the same.

In operation 1505 according to various embodiments, the second apparatus may acquire data based on the data channel.

According to various embodiments, the data channel may be mapped to one or more first subcarriers in the frequency domain.

According to various embodiments, the size of a first DFT/IDFT block related to the one or more first subcarriers may be 1/N times the size of an IFFT/FFT block related to a preset sampling frequency, and N may be a natural number.

For example, data obtained from the second apparatus may be obtained based on applying FFT to the data channel and then applying IDFT thereto, or may be obtained based on applying downsampling to the data channel. For example, the data obtainable based on applying FFT to the data channel and then applying IDFT thereto and the data obtainable based on applying downsampling to the data channel may be the same data. Conversely, for example, a data channel obtainable based on applying DFT and then applying IFFT and a data channel obtainable based on applying upsampling may be the same data channel.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

3. Exemplary Configurations of Devices Implementing Various Embodiments 3.1. Exemplary Configurations of Devices to which Various Embodiments are Applied FIG. 16 is a diagram illustrating devices that implement various embodiments of the present disclosure.

Figure 16:
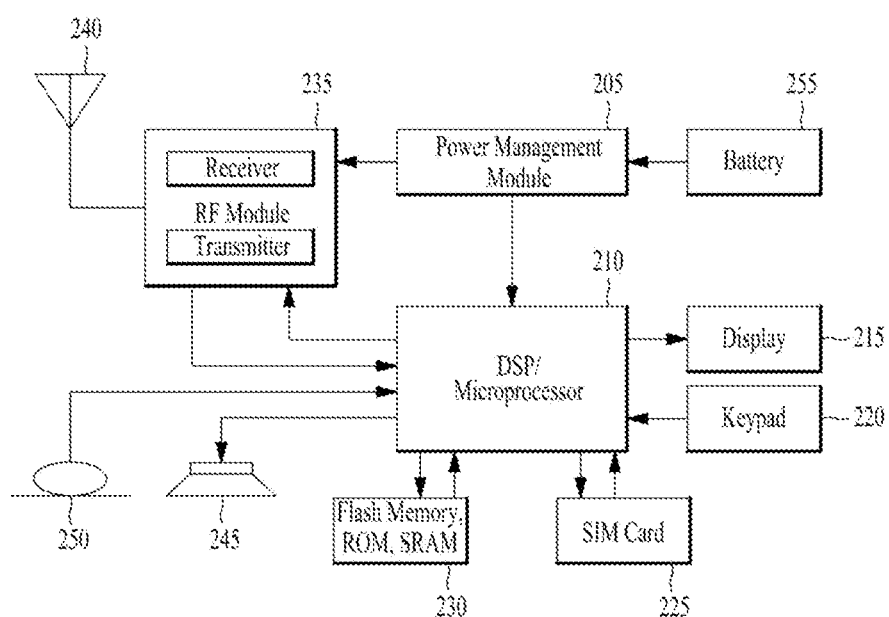
FIG. 16 is a block diagram illustrating an apparatus for implementing various embodiments of the present disclosure.

The devices illustrated in FIG. 16 may be a UE and/or a BS (e.g., eNB or gNB) adapted to perform the afore-described mechanisms, or any devices performing the same operation.

Referring to FIG. 16, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 16 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 16 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

For example, the first apparatus may be a base station/UE and the second apparatus may be a UE/base station.

According to various embodiments, one or more processors included in the first apparatus (or one or more processors of a communication device included in the first apparatus) may acquire/generate a data channel based on DFT-s-OFDM.

According to various embodiments, the one or more processors included in the first apparatus may transmit the data channel.

According to various embodiments, the data channel may be mapped to one or more first subcarriers in the frequency domain.

According to various embodiments, the size of a first DFT block related to the one or more first subcarriers may be 1/N times the size of an IFFT block related to a preset sampling frequency, and N may be a natural number.

According to various embodiments, one or more processors included in the second apparatus (or one or more processors of a communication device included in the second apparatus) may receive a data channel based on DFT-s-OFDM.

According to various embodiments, the one or more processors included in the second apparatus may transmit the data channel.

According to various embodiments, the data channel may be mapped to one or more first subcarriers in the frequency domain.

According to various embodiments, the size of a first IDFT block related to the one or more first subcarriers may be 1/N times the size of an FFT block related to a preset sampling frequency, and N may be a natural number.

A more specific operation of a processor included in a BS and/or a UE according to various embodiments of the present disclosure may be described and performed based on the afore-described clause 1 to clause 2.

Unless contradicting with each other, various embodiments of the present disclosure may be implemented in combination. For example, the BS and/or the UE according to various embodiments of the present disclosure may perform operations in combination of the embodiments of the afore-described clause 1 to clause 2, unless contradicting with each other.

3.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
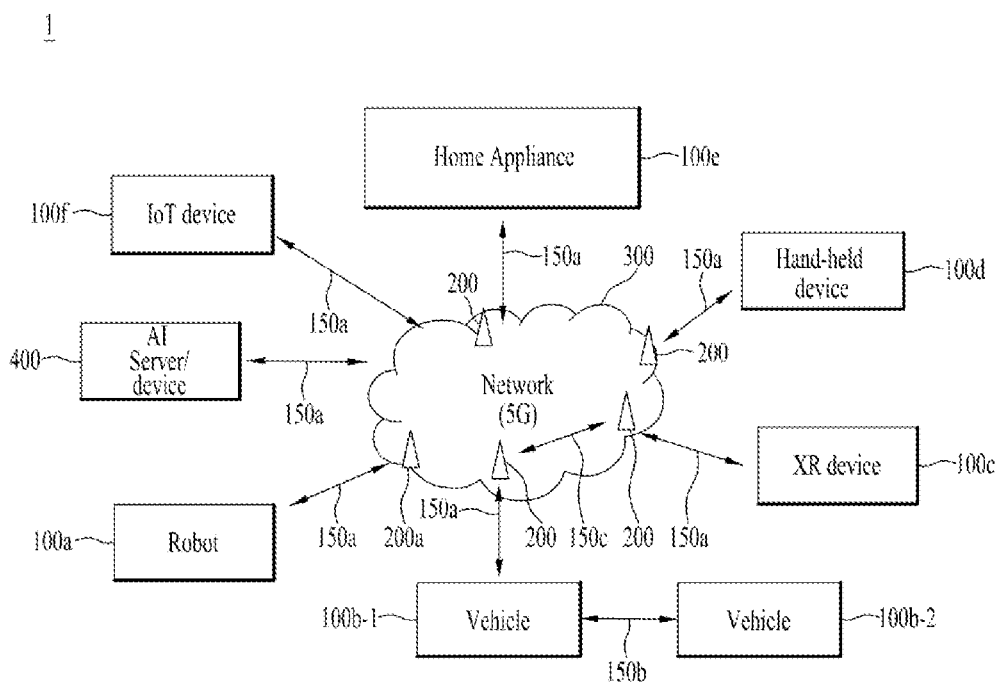
FIG. 17 illustrates an exemplary communication system to which various embodiments of the present disclosure are applied.

FIG. 17 illustrates an exemplary communication system to which various embodiments of the present disclosure are applied.

Referring to FIG. 17, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BS s/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 18:
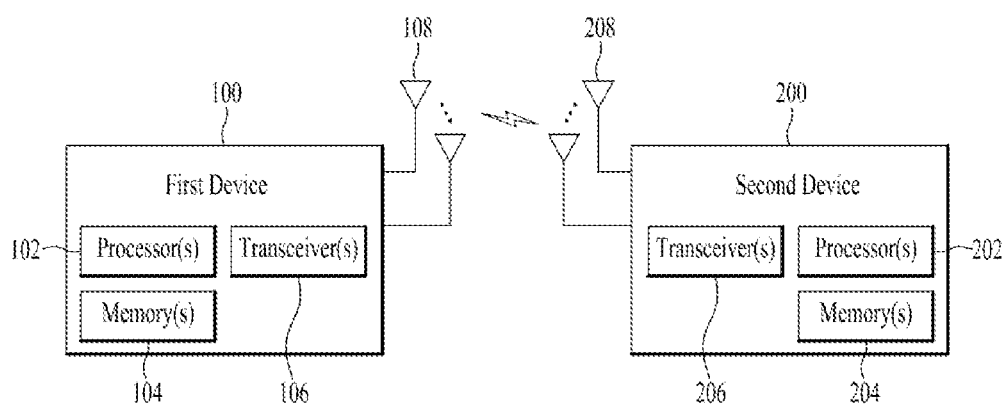
FIG. 18 illustrates exemplary wireless devices to which various embodiments of the present disclosure are applicable.

3.2.1 Example of Wireless Devices to which Various Embodiments of the Present Disclosure are Applied FIG. 18 illustrates exemplary wireless devices to which various embodiments of the present disclosure are applicable.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

3.2.2. Example of Signal Processing Circuit According to Various Embodiments of the Present Disclosure FIG. 19 is a diagram showing an example of a signal processing circuit according to various embodiments of the present disclosure.

Figure 19:
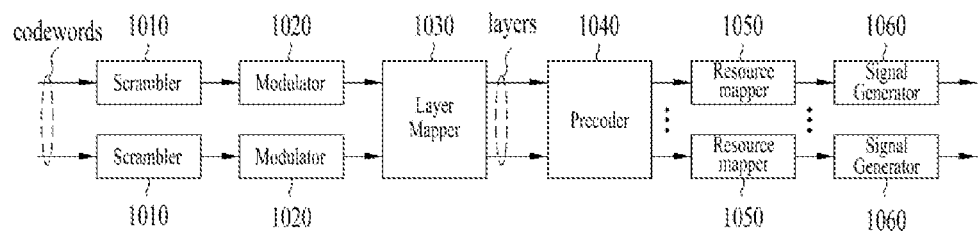
FIG. 19 is a diagram showing an example of a signal processing circuit according to various embodiments of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 22. Hardware elements of FIG. 19 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
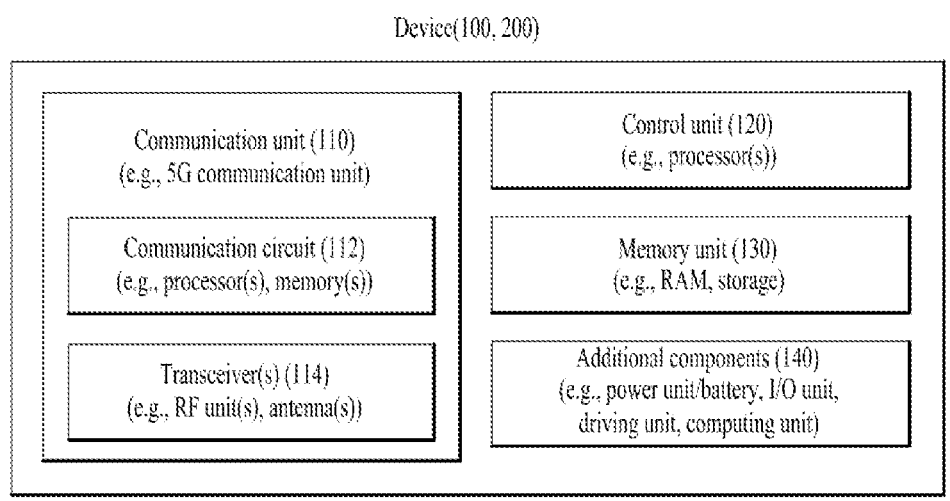
FIG. 20 illustrates other exemplary wireless devices to which various embodiments of the present disclosure are applied.

3.2.2. Example of Using Wireless Devices to which Various Embodiments of the Present Disclosure are Applied FIG. 20 illustrates other exemplary wireless devices to which various embodiments of the present disclosure are applied. The wireless devices may be implemented in various forms according to a use case/service (see FIG. 17).

Referring to FIG. 20, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
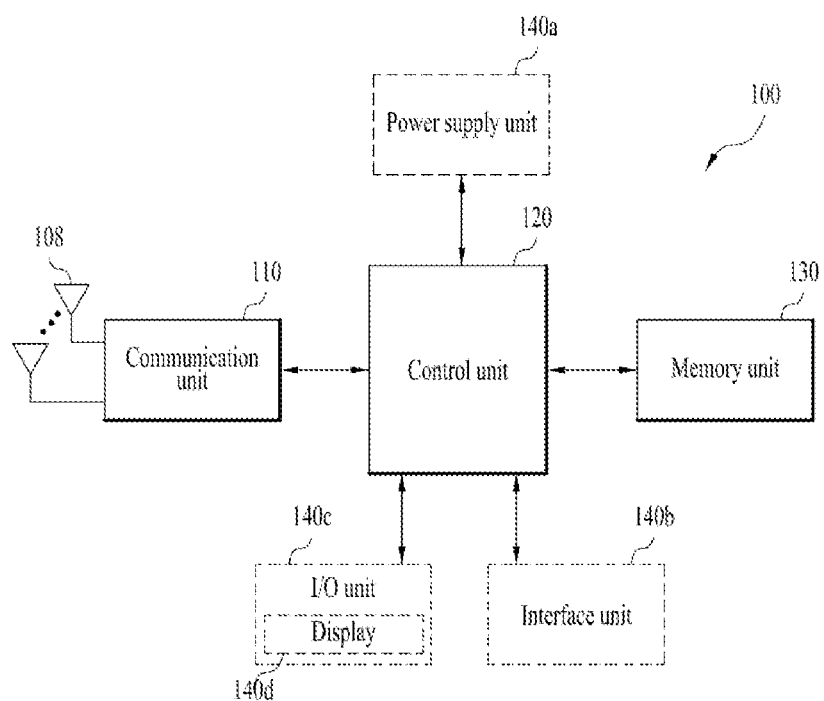
FIG. 21 illustrates an exemplary portable device to which various embodiments of the present disclosure are applied.

3.2.3. Example of Portable Device to which Various Embodiments of the Present Disclosure are Applied FIG. 21 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

3.2.4. Example of Vehicle or Autonomous Driving Vehicle to which Various Embodiments of the Present Disclosure.

Figure 22:
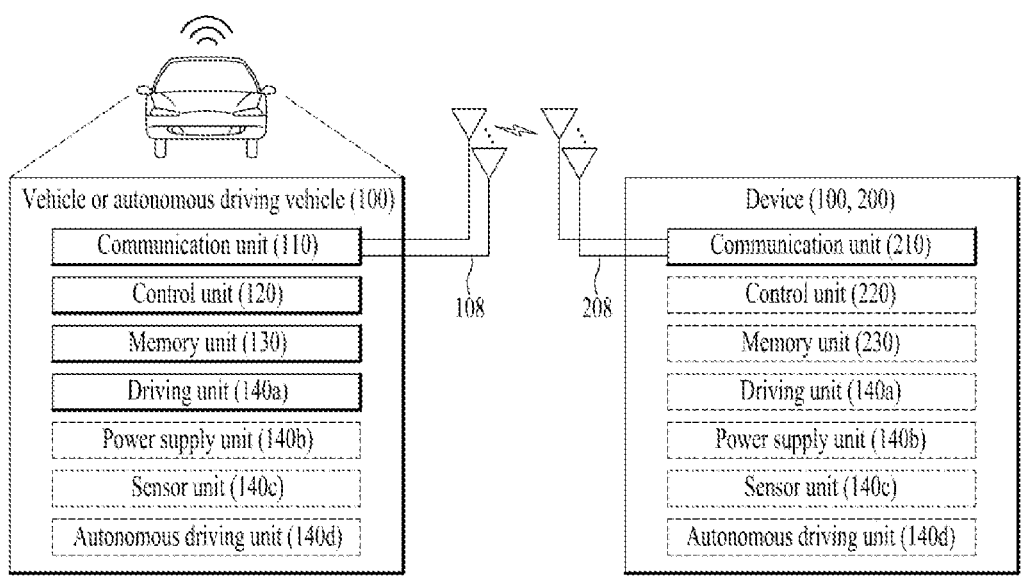
FIG. 22 illustrates an exemplary vehicle or autonomous driving vehicle to which various embodiments of the present disclosure.

FIG. 22 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multimode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

What is claimed is:

1. A method performed by a first apparatus in a wireless communication system, the method comprising:
obtaining a data channel based on discrete Fourier transform-spread-orthogonal frequency division multiplexing (DFT-s-OFDM); and
transmitting the data channel,
wherein the data channel is mapped to one or more first subcarriers in a frequency domain, and
wherein a size of a first discrete Fourier transform (DFT) block related to the one or more first subcarriers is 1/N times a size of an inverse fast Fourier transform (IFFT) block related to a preset sampling frequency, N being a natural number.

2. The method of claim 1, wherein the size of the first DFT block is limited such that 1/N times the size of the IFFT block is satisfied below a maximum DFT block size,
wherein a control channel for scheduling the data channel comprises information for setting the size of the first DFT block, and
wherein the maximum DFT block size is predefined or configured in a call setup process.

3. The method of claim 1, wherein, based on IFFT for obtaining the data channel being configured to be performed, the data channel is obtained based on applying the IFFT related to the IFFT block to an output of the first DFT block,
wherein based on upsampling for obtaining the data channel being configured to be performed, the data channel is obtained based on applying upsampling to a modulated symbol, and
wherein a filter set for downsampling corresponding to upsampling is predefined or configured in a call setup process.

4. The method of claim 3, wherein the data channel is obtained based on spectrum shaping,
wherein based on the IFFT for obtaining the data channel being configured to be performed, spectrum shaping is performed based on applying a spectrum shaping filter to the output of the first DFT block,
wherein based on upsampling for obtaining the data channel being configured to be performed, spectrum shaping is performed based on applying a waveform shaping filter after the upsampling is applied, and
wherein the waveform shaping filter is set such that an output of the waveform shaping filter corresponds to an output of the spectrum shaping filter.

5. The method of claim 1, wherein the data channel is mapped to the one of more first subcarriers and one or more second subcarriers in the frequency domain,
wherein a size of a second DFT block related to the one or more second subcarriers is 1/M times the size of the IFFT block, M being a natural number, and
wherein the method further comprises transmitting information for configuring a second apparatus to receive the data channel on (i) the one or more first subcarriers or the one or more second subcarriers or (ii) both the one or more first subcarriers and the one or more second subcarriers based on one or more of a traffic load and capability of the second apparatus receiving the data channel.

6. The method of claim 1, wherein:
(i) a number of one or more first subcarriers included in each of one or more resource blocks (RBs) comprising the one or more first subcarriers satisfies $2^A$,
(ii) among numbers greater than the number of one or more first subcarriers, a smallest number among numbers satisfying 1/N times the size of the IFFT block is the size of the first DFT block, or
(iii) among numbers less than the number of one or more first subcarriers, a largest number among numbers satisfying 1/N times the size of the IFFT block is the size of the first DFT block, and
A is an integer greater than or equal to 0.

7. The method of claim 1, further comprising transmitting a control channel for scheduling the data channel,
wherein the control channel is mapped to one or more third subcarriers in the frequency domain, and
wherein a size of a third DFT block related to the one or more third subcarriers is 1/B times the size of the IFFT block, B being a natural number.

8. The method of claim 7, wherein, based on the data channel and the control channel being transmitted in different frequency bands in a single carrier, the control channel comprises information on a frequency band in which the data channel is transmitted, and a timing gap corresponding to the capability of a second apparatus receiving the data channel and a second channel is set between the data channel and the control channel.

9. A first apparatus operating in a wireless communication system, the first apparatus comprising:
a memory; and
at least one processor coupled with the memory,
wherein the at least one processor is configured to:
obtain a data channel based on discrete Fourier transform-spread-orthogonal frequency division multiplexing (DFT-s-OFDM); and
transmit the data channel,
wherein the data channel is mapped to one or more first subcarriers in a frequency domain, and
a size of a first discrete Fourier transform (DFT) block related to the one or more first subcarriers is 1/N times a size of an inverse fast Fourier transform (IFFT) block related to a preset sampling frequency, N being a natural number.

10. The first apparatus of claim 9, wherein the size of the first DFT block is limited such that 1/N times the size of the IFFT block is satisfied below a maximum DFT block size,
wherein a control channel for scheduling the data channel comprises information for setting the size of the first DFT block, and
wherein the maximum DFT block size is predefined or configured in a call setup process.

11. The first apparatus of claim 9, wherein the at least one processor is further configured to communicate with one or more of a mobile terminal, a network, and an autonomous vehicle other than a vehicle comprising the first apparatus.

12. A method performed by a second apparatus in a wireless communication system, the method comprising:

receiving a data channel based on discrete Fourier transform-spread-orthogonal frequency division multiplexing (DFT-s-OFDM); and obtaining data based on the data channel, wherein the data channel is mapped to one or more first subcarriers in a frequency domain, and a size of a first inverse discrete Fourier transform (DFT) block related to the one or more first subcarriers is 1/N times a size of a fast Fourier transform (FFT) block related to a preset sampling frequency, N being a natural number.

13. A second apparatus operating in a wireless communication system, the second apparatus comprising:

a memory; and at least one processor coupled with the memory, wherein the at least one processor is configured to:

receive a data channel based on discrete Fourier transform-spread-orthogonal frequency division multiplexing (DFT-s-OFDM); and obtain data based on the data channel, wherein the data channel is mapped to one or more first subcarriers in a frequency domain, and a size of a first inverse discrete Fourier transform (IDFT) block related to the one or more first subcarriers is 1/N times a size of a fast Fourier transform (FFT) block related to a preset sampling frequency, N being a natural number.

* * * * *